April 9, 1929.    H. LINDBERG    1,708,547
LOCKING DEVICE FOR CAMERA SHUTTERS
Filed June 28, 1927
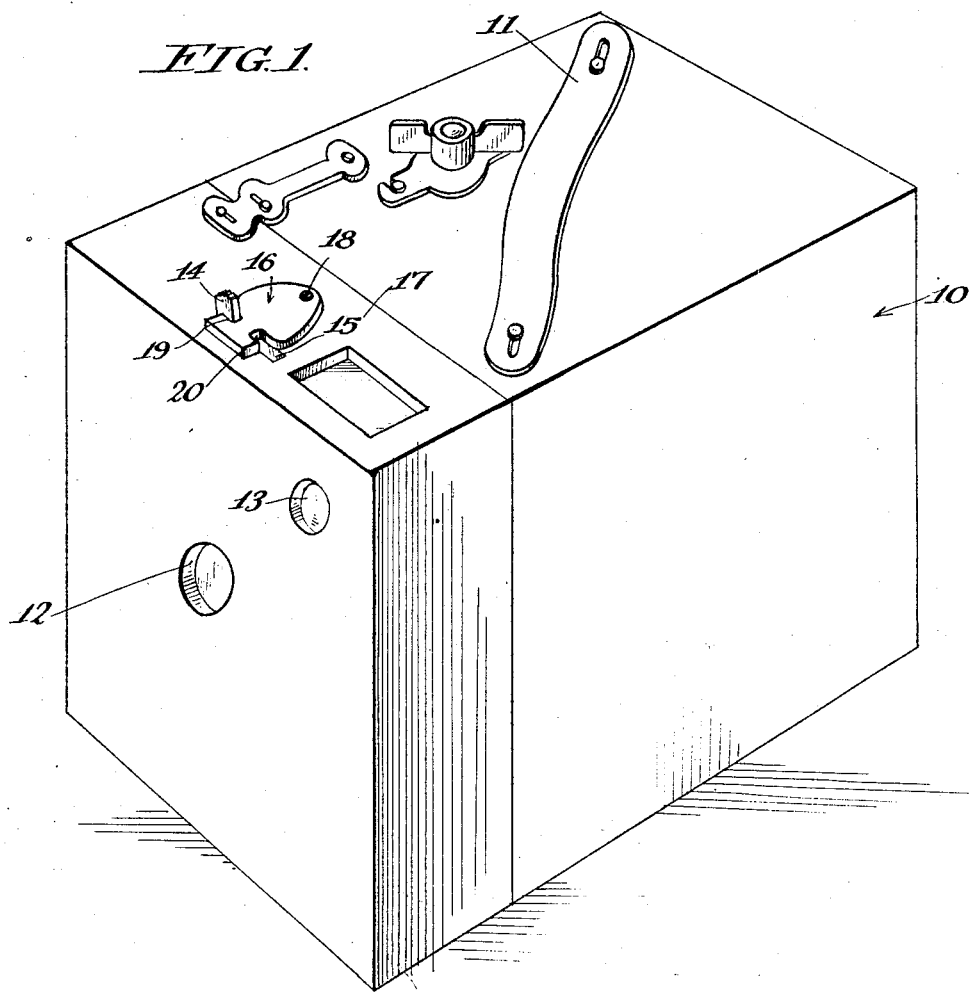
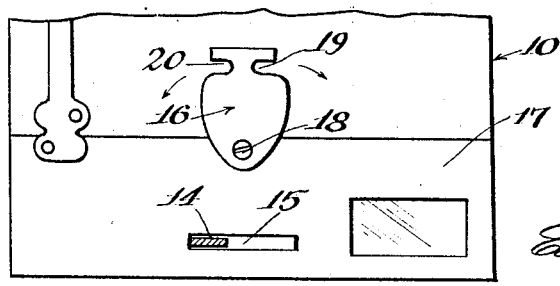
INVENTOR.
Hans Lindberg.
BY
ATTORNEY.

Patented Apr. 9, 1929.

1,708,547

UNITED STATES PATENT OFFICE.

HANS LINDBERG, OF LOS ANGELES, CALIFORNIA.

LOCKING DEVICE FOR CAMERA SHUTTERS.

Application filed June 28, 1927. Serial No. 201,992.

This invention relates to a camera attachment, and a chief object is to provide a lock for preventing an accidental tripping of the camera shutter when transporting the camera and thereby causing a premature exposure.

Cameras of the box type are provided with a trip lever for operating the shutter to expose a film, and as the end of the lever projects beyond the surface of the camera wall it is liable to be accidently moved when transporting the camera and thus spoil a film. By providing a lock for the shutter operating lever all danger of accidental operation of the shutter lever is avoided.

In an embodiment of the present invention as illustrated in the accompanying drawings wherein like figures represent corresponding parts, Fig. 1 is a perspective view of a box camera with the locking device affixed thereto.

Fig. 2 is a plan view of the front portion of the camera with the locking device in an inoperative position.

Referring to the drawings, 10 designates a camera case of the well known "box" type, provided with a carrying handle 11, lens opening 12, view finder 13, and a camera shutter operating lever 14 which projects through a slot 15 formed in a wall of the camera. Lever 14 is moved from one end of the slot 15 to the other when making a film exposure, and in order to prevent an accidental movement of the lever, a locking device is employed. This device preferably consists of a "heart" shaped metal plate 16 secured to the camera wall 17 by a pivot 18 in order that the plate may be shifted into and out of engagement with the shutter lever 14 when desired. The outer end of this locking plate is provided with a pair of oppositely disposed recesses 19 and 20 adapted to engage the shutter lever 14 in either of its retracted positions to lock the same against accidental movement.

When the lock is swung to the position shown in Fig. 2 the shutter lever may be operated in the usual manner to expose the films, and after an operation of the camera the metal plate is swung into the position as shown in Fig. 1 so that the recess 19 will engage the end of the lever 14. As the plate is pivoted it will be clear that when the recess 19 is brought into engagement with the lever it will have a slight wedging action and thus securely maintain the lever in its retracted or inoperative position. Preferably the plate is pivoted to the wall of the camera box so that there is a slight friction between the plate and the wall to prevent an accidental movement of the device.

From the above description, it will be apparent that I have devised a simple lock for camera shutter operating levers that will be cheap in construction and that may be readily applied to cameras of various makes.

What I claim is:

The combination with a camera provided with a shutter trip lever projecting through a wall of the casing, of a lever locking device comprising a pivoted plate having a pair of oppositely disposed wedge shaped recesses formed on its free end for engaging the lever in either of its retracted positions.

In testimony whereof I affix my signature.

HANS LINDBERG.